United States Patent
Largman

[11] 3,720,712
[45] March 13, 1973

[54] CYCLOALKANE-BISAMIDES

[75] Inventor: Theodore Largman, Morristown, N.J.

[73] Assignee: Allied Chemical Corporation, New York, N.Y.

[22] Filed: May 4, 1971

[21] Appl. No.: 140,278

[52] U.S. Cl. .............................. 260/558 A, 424/324
[51] Int. Cl. ..................................... C07c 103/86
[58] Field of Search ...................................... 260/558

[56] References Cited

OTHER PUBLICATIONS

Reynolds et al., J. Chem. & Eng. Data, Vol. 13, p. 558–560 (10/1968).
Zinner et al., J. Prakt. Chem., Vol. 17, p. 113–120 (1962).
Beaver et al., J. Am. Chem. Soc., Vol. 79, p. 1,236–1,245 (3/1957).

Primary Examiner—Harry I. Moatz
Attorney—Arthur J. Plantamura and Herbert G. Burkard

[57] ABSTRACT

Compounds of the structure

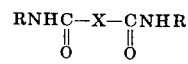

wherein R is mono or dichloro phenyl and wherein X is ortho, meta or para phenylene or a difunctional alicyclic group of four to six ring carbons which can be unsubstituted or substituted with $C_1$ to $C_3$ alkyl groups, are chemosterilants for insects, birds, and mammals. When X is a difunctional alicyclic group, as above described, particularly preferred compounds of the instant invention have the structure

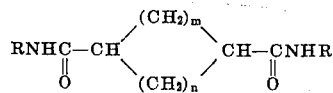

wherein $m$ and $n$, which can be the same or different can range from 0 to 2 with the sum of $m$ and $n$ ranging from 2 to 4.

1 Claim, No Drawings

CYCLOALKANE-BISAMIDES

BACKGROUND OF THE INVENTION

This invention relates to new diamides. These novel compounds are useful as chemosterilants for insects, birds, and mammals.

The control of insect, bird, and mammalian pest populations is often desirable and necessary for sanitary or food production reasons. The most common method for controlling such pests is by the use of compounds poisonous to the pest, e.g. insecticides, avicides, and rodenticides. For some applications, it is desirable that the pesticide be chemically stable and have extended residual activity; for other applications, it is desirable that its toxic life be short. Of course, where the pesticide is to be applied to the foliage or roots of plants or to soil in which plants are growing, it must be nonphytotoxic — at least at the applied dosage level.

Another way to control pests that has a greater potential than the use of fatal poisons is to sterilize such pests so that they cannot reproduce.

The use of the sterility principle among one or both sexes of the species for pest control is relatively new and was first successfully employed in the eradication of the screwworm fly (*Cochliomyia hominivorax*) (Coquerel) on the island of Curacao and in the southeastern part of the United States. This method of pest control possesses significant advantages over simple kill procedures, since at least some of any beneficial effect that the pest imparts to its natural environment is preserved. Moreover, sterile pests compete the normal pests in mating which, in effect, further decreases the possibility for population growth.

Known techniques employing the sterilization principle, however, possess various inherent disadvantages. In the aforementioned eradication of the screwworm fly, male members of the species were sterilized by exposure to gamma-radiation followed by release of the sterilized males into the area wherein insect reproduction was to be controlled. This irradiation technique possesses obvious limitations. It requires the mass release of sterilized insects which often may be undesirable or even impossible. It requires a rather expensive, uniquely designed radiation facility with specialized equipment to rear, transport, and irradiate a particular pest, and it also demands means of dispensing the irradiated pests after sterilization. In many cases, the irradiation technique of effecting sterilization drastically reduces the sexual competitiveness of the pest or even kills it.

On the other hand, many currently commercially available chemosterilants can be effectively administered only to pests at particular stages in their development, especially in the case of insects. Thus, for example, in order to secure a significant decrease of insect population, use of these chemosterilants requires treating newly emerged adult insects with the chemosterilants incorporated in dry feeds immediately prior to their release into their natural environment.

Additionally, certain chemosterilants have the disadvantage of being effective only against the female of the pest species. It is highly desirable to sterilize males since they in effect transmit or spread their sterility among the female population. A female that has mated with a sterile male will frequently not mate again. For this reason, it is better to sterilize a male pest than to kill it. An agent that sterilizes females only, on the other hand, cannot take advantage of this effect since females do not transmit their sterility. Fertile males will ordinarily mate with as many females, both sterile and fertile, as are available. Of course, an agent that sterilizes both sexes is especially desirable.

SUMMARY OF THE INVENTION

The novel compounds of the instant invention have the following structure

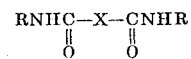

wherein R is mono or dichloro phenyl and wherein X is ortho, meta or para phenylene or a difunctional alicyclic group of four to six ring carbons which can be unsubstituted or substituted with $C_1$ to $C_3$ alkyl groups. When X is a difunctional alicyclic group, as above described, particularly preferred compounds of the instant invention have the structure

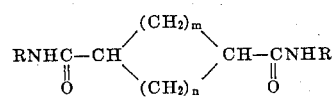

wherein $m$ and $n$, which can be the same or different, can range from 0 to 2 with the sum of $m$ and $n$ ranging from 2 to 4.

These compounds are prepared by the reaction of an acid chloride of the structure

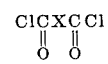

with two moles of mono or dichloro aniline in the presence of base. When administered to insects, birds, or mammals, these compounds effectively sterilize both sexes of most species.

DETAILED DESCRIPTION OF THE INVENTION

Preparation of the novel compounds of the instant invention is readily achieved in accordance with the following reaction.

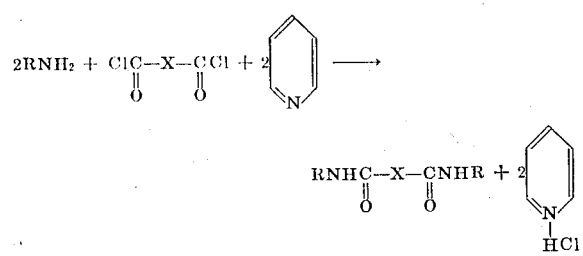

One molecule of diacid chloride is condensed with two molecules of amine $RNH_2$. At least two equivalents of pyridine or other tertiary amine are present to react with the hydrogen chloride that is liberated in the course of the condensation. Other bases that can suitably be used in place of pyridine include most tertiary amines such as triethylamine. Preferred bases such as pyridine or tertiary alkyl amines form a hydrochloride salt that is insoluble in the reaction medium thereby facilitating recovery of the product therefrom. The condensation reaction will not go in an acidic medium.

The reaction can be carried out in any common water-immiscible organic solvent that is inert to the reactants such as benzene, chloroform, toluene, $C_5$ to $C_{10}$ alkanes or cycloalkanes, ether, or carbon tetrachloride. Approximately stoichiometric amounts of the reactants are used, i.e. 2 mols of amine per mol of pinic acid chloride. However, an excess of either one of the reactants does no harm.

Inasmuch as it has been found necessary to remove substantially all the hydrogen chloride from the reaction medium to permit effective condensation, at least a two-fold molar excess of base should be present with respect to the theoretical amount of product to be formed, i.e. at least 1 mol of base per mol of HCl evolved. Preferably, a slight excess of base will be present to facilitate the reaction. Normally, the amine $RNH_2$ and the base are dissolved in the solvent with stirring and then the diacid chloride is added. The reaction is conveniently conducted at ambient temperatures, preferably 20°–30°C., and at atmospheric pressure. Higher or lower pressures or temperatures are useable but are not preferred. After stirring the reaction mixture for from about 0.5 hour to 2 hours, the precipitated salt formed by reaction of the base with HCl is removed by filtration or decantation. The filtrate is then washed with dilute hydrochloric acid and water to remove any excess base. The organic reaction solvent can then be evaporated to leave the product as a solid residue, which can be purified by recrystallization from a solvent such as alcohol.

The compounds of the instant invention are generally solid at room temperature. They are soluble in most organic solvents and essentially insoluble in water.

As heretofore indicated, $RNH_2$ is a mono or dichloro aniline. All of these anilines are known and commercially available. They include by way of example o-, m-, and p-chloroaniline and 2,3- 3,4- and 2,5- dichloroaniline.

The diacid chlorides of the formula

are obtained from the corresponding dicarboxylic acids, which are known compounds, by reaction with phosphorous pentachloride, thionyl chloride or other known reagents. Suitable diacid chlorides include o-, m-, and p-phthaloyl chlorides, the various isomeric cyclobutane, cyclopentane, and cyclohexane dicarboxylic acid chlorides such as

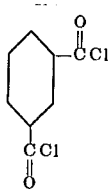 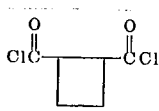

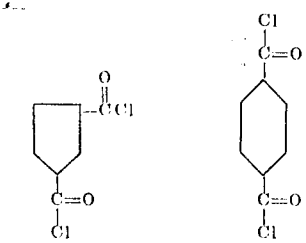

and position isomers thereof, and alkyl substituted alicyclic dicarboxylic acid chlorides such as, for example,

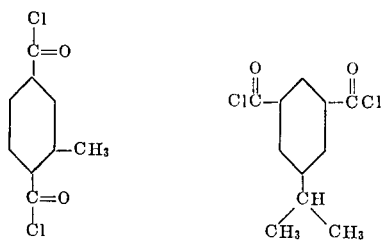

Pests that may suitably be controlled by use of the compounds of the instant invention include flies, such as, e.g. Tsetse flies and screwworm flies; corn-borers, bollweevils, mosquitoes, pigeon, guela bird (Sudan dioch) (red-billed guelea), oriental rice bird (Java sparrow) (*Padda orizivora*), mouse, brown rat, and vampire bat.

It is most convenient to administer the compounds of the instant invention to the pest in a feed-bait composition that the pest will ingest. The amount of active ingredient to be administered is determined by a consideration of factors such as pest type, i.e. insect, bird, or mammal, pest fecundative capabilities, climatic conditions, concentration of pest population, and the feeding habits of the pest and of contiguous nonpest species. Generally speaking, concentrations of chemosterilant in the range of from about 0.1 to 5.0 percent by weight, preferably 0.5 to 2.0 percent by weight, based on the amount of feed employed, have been found to impart effective sterilization to the pest population sought to be controlled. The concentration of the chemosterilant used should be sufficient to effect sterilization to a significant degree and not so great as to cause a significant number of deaths. Thus, the concentration utilized should not cause a pest mortality rate of greater than about 20 percent. For example, in the control of insects such as the common housefly (Musca domestica), concentrations below 0.1 percent did not secure effective sterilization, whereas concentrations in excess of 0.25 percent caused a high mortality rate. With bird or mammal pests, concentration levels of approximately 1.0 percent produce sterility, but do not cause excessive mortality. As previously mentioned, the various factors such as the species to be controlled, environment, biological resistance and activity affect the the concentration range of chemosterilant necessary to obtain irreversible sterilization by a simple and economical method. Also, the effect of the instant compounds is cumulative, so that assimilation of small doses over an extended time can effect sterilization.

Generally speaking, the feed-bait employed is a substance to which the insect, bird, or mammal is attracted. Any substance may be employed provided its properties present a desirable substance which the pest consumes. The feed-bait may comprise, for example, nonfat dry milk, granulated sugar, powdered eggs, malt, molasses, yeast, soybean or peanut butter or other feeding sources or combinations thereof having the chemosterilant incorporated into such feed-bait. The physical form of such feed is not critical and it may be introduced into the pest environment in solution or solid form. In the case of a feed-bait solution, an aqueous solution may be introduced into the environment by conventional means such as spraying or in solid form such as a dust or granulated substance. The solution feed composition should contain an alluring substance, although not necessarily of nutritious value, and the solvent should be free of any significant toxic properties. The solid feed-bait procedure utilizes an alluring substance that is coated or impregnated with the chemosterilant. Such a solid feed-bait carrier can readily be prepared by substantially homogeneously dispersing the solid feed in a solution of the chemosterilant in a suitable solvent such as acetone, methanol, etc. The solvent is then removed by evaporation with the impregnated feed carrier remaining behind. For application as a dust or as granules, the treated feed-bait is first pulverized by suitable conventional means.

The compounds of the instant invention have been found to be particularly effective insect chemosterilants thereby rendering them especially useful for the control of insects. When used for these purposes, they can be used alone or in conjunction with other insect control agents, including insecticides such as DDT, methoxychlor, and/or other chemosterilants and with insect sex attractants such as methyl eugenol.

The invention can be more fully understood by reference to the following examples. All parts are parts by weight unless otherwise expressly noted.

EXAMPLE 1

To a solution of 125 (1.0 mole) of p-chloroaniline in 1 liter of benzene was added 80 g (1.0 mole) of pyridine. The solution was stirred and then 100 g (0.5 mole) of terphthaloyl chloride dissolved in 250 cc of benzene was added dropwise with stirring. After addition was complete, the pyridine hydrochloride precipitate which formed was separated by suction filtration and the filtrate washed once with 500 cc of 0.1 N HCl and once with 500 cc of distilled water. The washed filtrate was dried over MgSO₄, filtered and flash evaporated affording 175 g (91 percent) of the compound

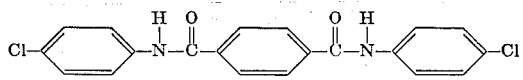

Structure confirmed by I.R., NMR, and elemental analysis.

EXAMPLE 2

The procedure of Example 1 was followed with the exception that in each case a different amine and diacid chloride was utilized. The amines and diacid chlorides utilized are tabulated below. In all cases, the corresponding diamide was recovered in greater than 90 percent yield.

| Amine | Diacid Chloride |
|---|---|
| m-chloroaniline | o-phthaloylchloride |
| o-chloroaniline | m-phthaloylchloride |
| 2,3-dichloroaniline | 1,2-cyclobutane dicarboxylic acid chloride |
| 3,4-dichloroaniline | 1,3-cyclopentane dicarboxylic acid chloride |
| 2,5-dichloroaniline | 1,3-cyclohexane dicarboxylic acid chloride |
| p-chloroaniline | 3,5-dimethylcyclohexane-1,4-dicarboxylic acid chloride |

EXAMPLE 3

When added to an appropriate food for the particular pest species being tested at a concentration of 1.0 weight per cent and fed to a variety of bird and mammalian pest species, all of the compounds prepared in Examples 1 and 2 imparted some degree of both male and female sterilization based on a comparison with the fertility rates of a comparison group of the same species fed untreated food. Among the pest species which showed themselves amenable to sterilization were pigeons, rice birds, brown rat, and house mouse.

EXAMPLE 4

When added to an appropriate food for the particular pest species being tested at a concentration of 0.2 weight percent and fed to a variety of insect pest species, all of the compounds prepared in Examples 1 and 2 imparted some degree of both male and female sterilization based on a comparison with the fertility rates of a comparison group of the same species fed untreated food. Among the pest species which showed themselves amenable to sterilization were house fly, mosquito and boll-weevil.

I claim:

1. A compound of the structure:

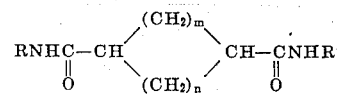

wherein $m$ and $n$, which can be the same or different, can range from 0 to 2 with the sum of $m$ and $n$ ranging from 2 to 4, and wherein R is mono or dichloro phenyl.

* * * * *